United States Patent Office 3,621,557
Patented Nov. 23, 1971

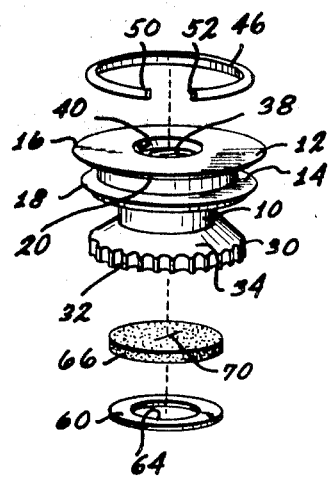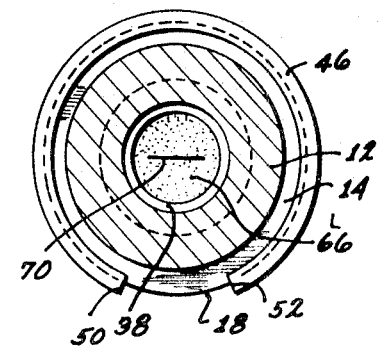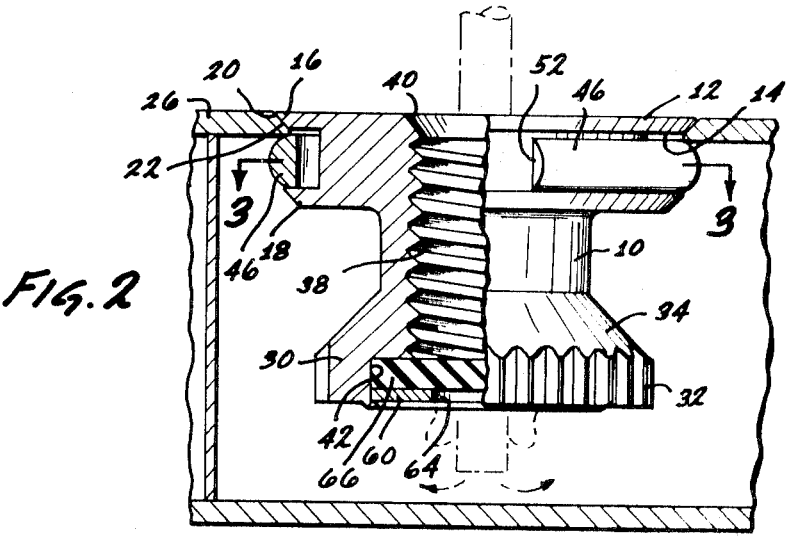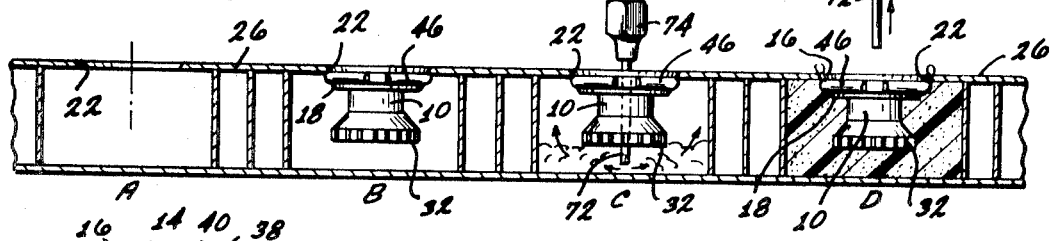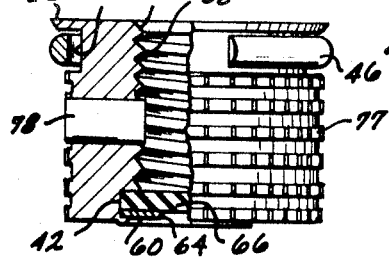

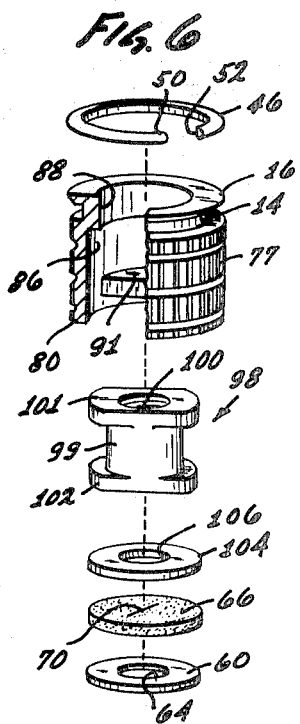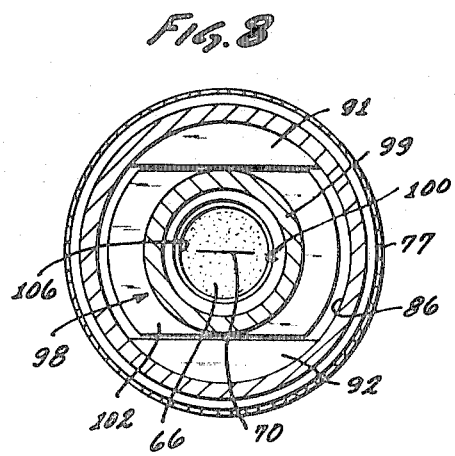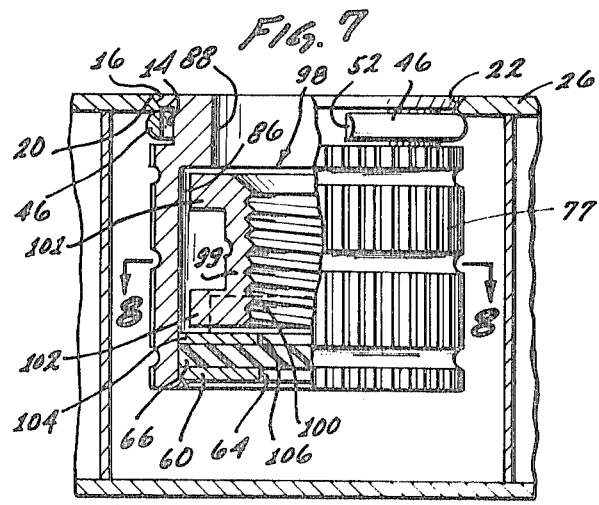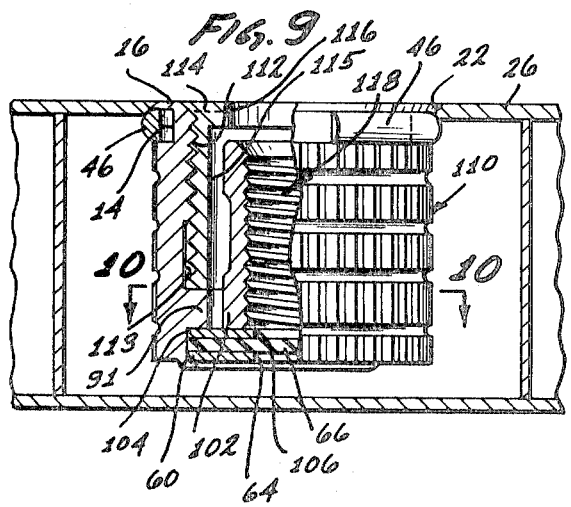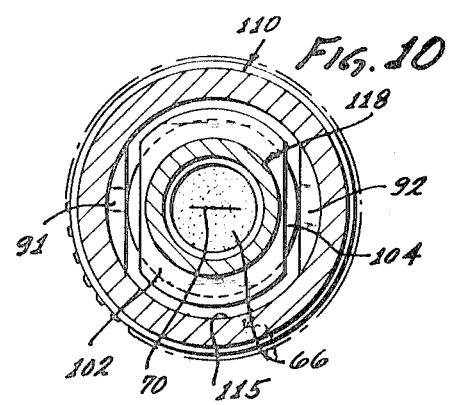

3,621,557
INSERT FOR SANDWICH PANELS AND METHOD OF INSTALLATION
Kenneth V. Cushman, Santa Ana, and Delmar S. Miller, Newport Beach, Calif., assignor to Delron Fastener Division of Rex Chainbelt, Inc., Milwaukee, Wis.
Filed June 6, 1969, Ser. No. 831,162
Int. Cl. B23p *3/00, 19/04*
U.S. Cl. 29—460
7 Claims

ABSTRACT OF THE DISCLOSURE

The device is an insert to be potted (molded) into light weight cores or sandwich panels. It has a flanged head with detent means to hold the insert in position in which it is to be potted in, in the panel. An improved method is provided whereby the potting material is injected through the bore of the insert, back flow being prevented by a diaphragm or valve disc having a slit (in a preferred form) through which the nozzle of the potting gun is inserted. The insert may be of the floating nut type with improved means in the bore of the insert to prevent rotation of the nut.

SUMMARY OF THE INVENTION

This invention relates generally to fastener fittings for lightweight sandwich panels such as are used in the interior walls and for construction of airplane fuselages and, in particular, to the type of fastener fitting known in the industry as a "molded insert" fastener. In general, such fasteners utilize a solidified body of cement or anchoring material, such as epoxy resin molded into a cavity in the sandwich panels and around the inserts so as to anchor the insert within the panel with one end of the insert exposed in an opening in one side of the panel for securement to the insert, and thus to the panel of another fastener part which is a threaded nut or screw extending through a bracket or other member to be attached to the panel and threaded into the insert. The invention relates also to methods of installing the inserts.

In the types of panels referred to, generally there is a central body or core constructed of extremely lightweight aluminum ribbon material, that is, foil, which because of the honeycomb cell structure provides adequate strength in the aggregate over the entire area of the panel. The structure is cellular, the cells having parallel axes normal to the planes of the outer skin sheets. The strength is due to the extremely large number of cells of quite small diameter, and that the skin sheets are bound together in a fairly rigid, but extremely light-weight sandwich, construction. These panels, while having many advantages, present difficulties including the tendency of the attached parts to pull loose from the panels, and also to damaging of the panel surface where fasteners are riveted or otherwise forcibly attached to the panel.

The primary object of the present invention is to provide an improved, light-weight sandwich panel construction embodying an insert anchored therein by a molded body which may have a floating nut for selfaligning reception of a threaded stud or screw. The improvements lie primarily in the construction of the insert body and floating nut, as stated more specifically hereinafter. The improvements are calculated to overcome the deficiencies as set forth in the foregoing.

Another object is to provide an improved method of installation of the insert nut in the honeycomb panel. Ordinarily, the insert is molded into a blind bore or hole in the honeycomb panel. Preferably, the insert member is held in a position with its top head or flange in a position in the outer end of the hole with the flange flush with the surface of the outer surface of the skin sheet of the panel. The anchoring material, or resin with catalyst are then injected through the insert member into the hole in the space around the insert and in the space between the bottom head and the bottom of the hole.

Efforts have been made in the past to devise an effective insert that can be molded into a sandwich panel, and methods of installing the insert such as illustrated by such patents as Nos. 3,016,578; No. 3,271,498; No. 3,282,215; No. 3,339,609; and No. 3,338,225.

Specific objectives of the herein invention which achieve superior characteristics with respect to the prior art include the following:

(1) To give the insert the capability in a very simple way of holding itself in the hole in which it is to be potted with the end surface of its top head flush with the surface of the panel, and centered in the hole.

(2) To eliminate the need for separate means to hold the insert in position while it is being potted.

(3) To eliminate the need for potting holes and/or vent holes in the top head of the insert for purposes of potting, but on the other hand to use the bore in the insert itself for purposes of potting with venting between the head and periphery of the hole in the panel. In this manner air is expelled from the bottom area past the head of the fastener. This makes possible 100% void free installations and thus inserts can be made smaller saving weight and material cost.

(4) To make it possible by way of a valve member to inject the potting material through the bore of the insert while back flow of the potting material into the insert is obstructed.

(5) To simplify and make more economical the potting in of inserts, by injecting, compound through the bore of the insert by way of means normally closing off the bore.

With respect to the insert itself the objects include that of providing novel and improved means in the form of a detent, for holding the insert in position while potting.

A further object is to provide an insert of the floater type in which the floating nut is removable.

Another object is to provide an insert of the type referred to having an improved construction which is within the bore of the insert for preventing rotation of the nut.

Further objects and additional advantages of the invention will become apparent from the following detailed description and annexed drawings wherein:

FIG. 1 is an exploded view of a preferred form of the insert (not of the floating nut type);

FIG. 2 is a sectional view of the insert of FIG. 1 in position in a panel;

FIG. 3 is a sectional view taken along the line 3—3 of FIG. 2;

FIG. 4 is a sectional view of a panel illustrating steps in the method of installation, that is, potting in of the inserts;

FIG. 5 is a partly sectional view of another form of insert;

FIG. 6 is an exploded view of a form of insert similar to that shown in FIG. 5, but of the floating nut type.

FIG. 7 is a view partly in section of the insert of FIG. 6 in position in a panel;

FIG. 8 is a sectional view taken along the line 8—8 of FIG. 7;

FIG. 9 is a sectional view of a modified form of insert, wherein the floating nut is removable; and FIG. 10 is a sectional view taken along line 10—10 of FIG. 9.

Referring to FIGS. 1 to 4 of the drawings, these figures illustrate a preferred form of insert, and they illustrate the method of installation. The insert comprises a tubular body or barrel part 10 and a cylindrical head 12 having an annular groove 14. The sides of the annular groove form flanges 16 and 18 and the edges of which are tapered. The upper flange has an edge taper that tapers outwardly to a larger diameter as indicated at 20 and when the insert is in position this tapered surface is complementary to an oppositely tapered edge surface 22 of the periphery of the hole in the top skin sheet 26 of the sandwich panel shown in FIG. 2.

The insert has a lower head 30 which is cylindrical and serrated as shown at 32, the serrations being for purposes of providing a non-rotating feature in that the serrations engage with the potted material after it has been injected and has been allowed to set. Between the barrel 10 of the insert and lower head 30 there is a taper as designated at 34.

The insert has a threaded bore 38 at the upper end of which is a tapered counterbore 40 and at the lower end of which is an enlarged cylindrical counterbore 42.

Received in the groove 14 is a spring wire 46 that forms a spring detent in cooperation with the hole in the top skin sheet 26 of the sandwich panel. This spring wire is generally circular having ends 50 and 52. As may be seen, the detent spring 46 is deformable primarily in a radial direction. The spring 46 in its normal expanded state has parts having a larger diameter than the diameter of the hole in the top skin sheet 26, that is as defined by the tapered surface 22. During installation, when the insert is inserted into the hole in the panel, the insert, of course, passes through the hole and then the spring 46 engages the tapered surface 22 at the periphery of the hole in the top skin sheet 26 causing the spring 46 to deform in the manner of a detent and to allow the flange 18 of the insert to go through the hole after which the spring 46 expands outwardly, that is, snaps outwardly so that it engages the under surface of the skin sheet 26 at the periphery of the hole so as to hold the insert in position accurately centered in the hole, and with the flat top surface of the head of the insert flush with the surface of the skin sheet. The figures show a preferred form of spring which is made from a suitable resilient material with the spacing being ends 50 and 52 designed to allow these ends to be spaced to pass over the diameter of the insert between flanges 16 and 18 without having to pass over flange 18.

Numeral 60 designates a washer made of a suitable material such as metal, the washer having an aperture or opening 64. Numeral 66 designates a valve disc that fits against the washer 60, this disc being made of live rubber, for example, with a Shore hardness of approximately 40-45. However, neoprene and buna-n are synthetics that may be used if desired depending on environments in which the insert is to be used, particularly if the environment is one involving higher temperatures, solvents or chemicals that may come in contact with the insert. Material 66 has a slit at the center along a diameter as designated at 70 for a purpose which will be explained presently. The disc 66 and washer 60 are assembled in counterbore 42 as shown in FIG. 2.

FIG. 4 illustrates the method of installation, this figure showing a typical sandwich panel having a thin top skin sheet 26 and the successive steps being illustrated at A, B, C, and D. At A there is illustrated a bore in the top skin sheet to accommodate the insert, the periphery of the hole having the tapered surface 22.

At B is illustrated the insert after having been inserted through the hole in the top skin sheet by thumb pressure. It will be observed that the spring 46 is snapped past the tapered surface 22 so that the spring is below the peripheral edge of the hole in the top skin sheet, this holding the insert firmly without lateral floating with its axis normal to the hole, and with the top surface of the head of the insert flush with the skin sheet.

Injection of the potting material is directly through the threaded bore 38 of the insert as illustrated at C in FIG. 4. Various known types of potting guns or equipment may be used. However, the potting material is injected through a thin tubular stem 72 which is on the order of a hypodermic needle, the stem extending from a fitting 74 at the end of the potting gun 76. The end of the stem or needle 72 is inserted through the slit 70 in the disc 66 which forms a valve, the stem, of course, extending through the aperture or hole in the washer 60. As the potting material is injected it fills the hole with the air above the potting material being expelled or vented between the peripheral edge surface of the flange 16 and the peripheral edge 22 of the hole in the top skin sheet. No separate apertures or holes are required in the insert either for injecting the potting mateial or for venting the air. A vent hole could, of course, be provided in the top head if desired.

Part D of FIG. 4 shows the installation completed and the injection stem or needle withdrawn from the insert. When it is withdrawn the slit 70 closes and the disc 66 acts as a valve preventing any backflow of potting material into the bore 38 of the insert. The valve formed by the disc 66 allows easy insertion of the injection stem or needle but still restrains the soft potting material from over extending when injecting and over expanding while it is curing. Most all potting materials or compounds, which may be epoxies, expand in curing. With the type of insert as shown in FIGS. 1 to 4 it is not necessary to have a metal disc on the top side of the flexible resilient material 66 since the resilient material is sufficiently restrained by the shoulder at the end of bore 38. Any minor upward deformation of the disc 66 in the fastener as shown would not be detrimental. As the hole in which the insert is installed fills up, in practice, tiny beads of compound extrude between the flange 16 and the end surface 22 indicating that the hole is filled. These small beads can be wiped off immediately before the compound cures or materials such as polyvinyl alcohol can be sprayed around the installed fastener and top surface of the panel to form a thin plastic coating. When used in this manner it does not allow adhesion to any contacting surface. Thus, any clean up after installation is negligible. No holding devices or the use of masking tape is required. Furthermore, stack curing is possible whereas otherwise it would not be. The insert is initially snapped in by thumb pressure. Stack curing is not possible where any devices used to hold the insert in position extend above the skin surface.

While it is preferred to inject through the valve disc 66 at the end of bore 38, an injection opening or openings could be provided at other places in the insert controlled by a similar valve disc.

FIG. 5 shows a slightly modified form of insert which may be potted in using the same method. It is cylindrical having an externally knurled surface 77 to resist rotation and having a radial fiber or composition thread locking member 78.

FIGS. 6 to 8 show a modified form of the insert which may be installed by the same method. The insert of FIGS. 6, 7, and 8 is a floater type having within it a fastener in the form of a nut which is free to float laterally and to accommodate for alignment of another fastener in it such as a threaded stem on which the nut is engaged. The insert of this embodiment is an improvement relative to the insert shown in the application of Kenneth V. Cushman and William R. Zoller, Ser. No. 732,262 filed May 27, 1968, now Pat. No. 3,504,723.

Parts in the present embodiment that are alike or the same as corresponding parts in previous embodiments are identified by the same reference numerals. As may be seen in FIGS. 6, 7 and 8, the insert has a cylindrical body part as designated at 80 having an annular groove 14 with flange 16 like the previous embodiment. Engageable in the annular groove 14 is detent spring 46 which is interrupted as shown and it is substantially round as previously described. The outside surface of the body is knurled as shown.

The body 80 has a bore 86 and a counterbore 88 of smaller diameter at the top end. Adjacent the lower end of the insert within bore 86 are embossments 91 and 92 having inner edges that are parallel chords of the bore 86. These edges are conveniently formed by broaching and there may be four of them forming in effect a square opening broached from a round hole. That is, with a single stroke the corners of a pre-drilled hole are broached.

Within the insert is the floating nut 98 which is cylindrical having a threaded bore 100. The nut 98 may have any desired axial extent. The nut 98 has a cylindrical body 99 and threaded bore 100. It has flat sided end keys or lugs 101 and 102 at both ends which are formed by milling or broaching. As may be observed, the nut 98 can float laterally to accommodate the alignment purposes described above and it is held from rotation by reason of fitting between the edges of parts 91 and 92. This type of nut may be made a lock nut very simply only by deforming two thin walls on opposite sides to misphase the threads. Such deformation would be done at approximately the half way point of the threads. Counterbore 88 forms a shoulder engageable with top key 101 preventing escape of the nut.

Fitting in the bore 86 is washer 60 and resilient valve member 66 like that of the previous embodiment. Above disc 66 is another washer as designated at 104 having a central opening 106 through which the injection stem or nozzle 2 or hypodermic needle can be inserted. Thus deformation of the valve formed by the resilient member 66 is limited. The washers and disc fit in bore 86 below the embossments 91 and 92 which retain them.

The installation of the insert of FIGS. 6, 7 and 8 is by the method as described of the previous embodiment.

FIGS. 9 and 10 show another embodiment of the invention which is similar to that of the previous embodiment similar parts being identified by the same reference characters. However, the insert as designated at 110 has a threaded counterbore 112 above bore 113 that receives threaded sleeve 114 which has a smooth bore 115 of smaller diameter and counterbore 116 so that with the sleeve 114 in position the floating nut 118 is retained within the insert but by removing the sleeve 114 the floating nut 118 is removable. As shown the nut 118 has only the lower key 102 but it may have a key at both ends like nut 98.

From the foregoing, those skilled in the art will readily observe and understand the nature and construction of the invention and of the method and the manner in which the invention achieves and realizes all the objects and advantages as set forth in the foregoing as well as the many additional advantages that are apparent from the detailed description.

The foregoing disclosure is representative of preferred embodiments of the invention and is to be interpreted in an illustrative rather than a limiting sense, the invention to be accorded the full scope of the claims appended hereto.

What is claimed is:

1. In the art of installing a fastener insert in a sandwich panel embodying a fragile low density core sandwiched between spaced solid skin sheets, the method comprising, providing a hole in said panel beginning with an aperture in one of said skin sheets and extending into said core, utilizing an insert including a mounting head proportioned to fit within said aperture, and a central bore of smaller diameter than said head, extending axially therefrom and receivable in said hole in said core, projecting said insert into said hole and moving said head into closing relation to said aperture, providing supporting attachment between said head and said skin sheet, subsequently injecting potting material through the central bore through said insert into said hole by applying the nozzle of an injection gun through said central bore of said insert, venting said hole to allow air to displace therefrom during the injecting of said potting material, obstructing passage of the potting material up into the interior of the central bore of the insert and withdrawing the injection gun and allowing the potting material to set.

2. A method as in claim 1 including the step of causing the supporting attachment to become effective by engagement of a part of the insert underneath the peripheral edge of the hole in the skin sheet.

3. A method as in claim 1 including injecting the potting material through a diaphragm positioned to obstruct backflow of material into the insert.

4. A method as in claim 1 including venting the hole while the potting material is being injected between the head of the insert and the hole in the panel.

5. A method as in claim 1 including the step of inspecting the joint between the head and the hole in the panel during injection and stopping injection when the potting material commences to exude through the joint.

6. A method as in claim 1 including the step of providing detent means on the head engageable with the periphery of the hole in the panel and holding the insert in position by engagement of the detent means with the periphery of the hole.

7. A method as in claim 1 including the step of closing the interior of the insert at the bottom and providing an aperture for injection of potting material into the hole and closing the aperture obstructing backflow into the insert, upon withdrawal of the gun.

References Cited
UNITED STATES PATENTS

| | | | |
|---|---|---|---|
| 2,478,508 | 8/1949 | Simpson | 85—63 X |
| 3,132,382 | 5/1964 | Magester | 29—460 UX |
| 3,384,142 | 5/1968 | Phelan | 29— 460 UX |
| 3,417,803 | 12/1968 | Rohe et al. | 151—41.73 |
| 3,434,261 | 3/1969 | Rohe | 151—41.7 |

CHARLIE T. MOON, Primary Examiner

U.S. Cl. X.R.

29—530; 151—41.7